US010641482B2

(12) United States Patent
Leach et al.

(10) Patent No.: US 10,641,482 B2
(45) Date of Patent: May 5, 2020

(54) METHODS FOR OPERATING A FURNACE

(71) Applicant: IMERYS USA, INC., Roswell, GA (US)

(72) Inventors: Billie Leach, Murfreesboro, TN (US); Thomas Landon, Marietta, GA (US)

(73) Assignee: Imerys USA, Inc., Roswell, GA (US)

(*) Notice: Subject to any disclaimer, the term of this patent is extended or adjusted under 35 U.S.C. 154(b) by 213 days.

(21) Appl. No.: 14/833,294

(22) Filed: Aug. 24, 2015

(65) Prior Publication Data
US 2015/0362186 A1 Dec. 17, 2015

Related U.S. Application Data

(60) Division of application No. 13/125,686, filed as application No. PCT/US2009/005805 on Oct. 26, 2008, now abandoned, which is a continuation of application No. 12/263,705, filed on Nov. 3, 2008, now Pat. No. 8,196,533.

(60) Provisional application No. 61/108,700, filed on Oct. 27, 2008.

(51) Int. Cl.
F23J 7/00 (2006.01)
F23J 9/00 (2006.01)
C09C 1/40 (2006.01)
F23C 10/18 (2006.01)
F23C 10/28 (2006.01)
F23C 10/00 (2006.01)
F23C 10/30 (2006.01)
F23C 10/01 (2006.01)
F23G 5/30 (2006.01)

(52) U.S. Cl.
CPC ............... *F23J 7/00* (2013.01); *C09C 1/402* (2013.01); *F23C 10/00* (2013.01); *F23C 10/01* (2013.01); *F23C 10/18* (2013.01); *F23C 10/28* (2013.01); *F23C 10/30* (2013.01); *F23G 5/30* (2013.01); *F23J 9/00* (2013.01); *C01P 2004/61* (2013.01); *C01P 2004/62* (2013.01); *C01P 2006/80* (2013.01); *F23C 2206/00* (2013.01); *F23G 2200/00* (2013.01); *F23G 2207/60* (2013.01); *F23K 2201/505* (2013.01)

(58) Field of Classification Search
None
See application file for complete search history.

(56) References Cited

U.S. PATENT DOCUMENTS

| 3,907,674 | A | 9/1975 | Roberts et al. |
| 4,086,320 | A | 4/1978 | Martin et al. |
| 4,251,265 | A | 2/1981 | Stratton et al. |
| 4,387,653 | A | 6/1983 | Voss |
| 4,771,712 | A | 9/1988 | Engstrom et al. |
| 4,927,348 | A | 5/1990 | Avidan |
| 5,008,220 | A | 4/1991 | Brown et al. |
| 5,298,473 | A | 3/1994 | Pinnavaia et al. |
| 5,353,721 | A | 10/1994 | Mansour et al. |
| 6,808,692 | B2 | 10/2004 | Oehr |
| 2006/0210463 | A1 | 9/2006 | Comrie |

FOREIGN PATENT DOCUMENTS

| EP | 0338103 A1 | 10/1989 |
| WO | WO99/11976 A1 | 3/1999 |
| WO | WO2008/116117 A1 | 9/2008 |
| WO | WO 2010/051018 A1 | 5/2010 |

OTHER PUBLICATIONS

International Search Report and Written Opinion dated Dec. 28, 2009, in International Application No. PCT/US2009/005805, filed Oct. 26, 2009.
European Patent Office Application No. 11177696.9-1008/2394957, Reference P117082EPPC01, Communication of a notice of opposition, Sep. 10, 2018.
Davidsson et al., *Kaolin Addition During Biomass Combustion in a 35 MW Circulating Fluidized-Bed Boiler*, Energy & Fuels, vol. 21, No. 4, 2007, 1959-1966.
Henttonen, "The Effects of Calcium for Retention Chemicals," Engineering Thesis, Tampere Polytechnic International Pulp and Paper Technology, Nov. 2006.

*Primary Examiner* — Steven B McAllister
*Assistant Examiner* — John E Bargero
(74) *Attorney, Agent, or Firm* — Finnegan, Henderson, Farabow, Garrett & Dunner

(57) ABSTRACT

A method for combusting fuel in the presence of an alkali-containing material may include introducing fuel into a furnace configured to combust the fuel. The method may also include introducing ball clay having a moisture content of at least about 5% by weight into the furnace, and heating at least a portion of the fuel and ball clay, such that at least a portion of the ball clay is at least partially calcined, and the at least partially calcined ball clay adsorbs at least a portion of alkali present in the furnace.

20 Claims, No Drawings

METHODS FOR OPERATING A FURNACE

RELATED APPLICATION

This application is a Divisional U.S. patent application Ser. No. 13/125,686, filed Aug. 19, 2011, which is a U.S. national stage entry under 35 U.S.C. § 371 from PCT International Application No. PCT/US2009/005805, filed Oct. 26, 2009, and claims priority to and the benefit of the filing date of U.S. Provisional Application No. 61/108,700, filed on Oct. 27, 2008, and U.S. application Ser. No. 12/263,705, filed on Nov. 3, 2008, the disclosures of all of which are incorporated herein by reference.

TECHNICAL FIELD

The present disclosure relates to methods for operating furnaces, and more particularly, to methods for operating furnaces such as, for example, fluidized-bed reactors, by including introduction of hydrous clay into the furnace.

BACKGROUND

Combustion processes may be used in power plant furnaces to generate heat for operating a boiler or steam generator, which generates electric power. The fuel used for such processes may include coal, petroleum coke, and/or biofuel derived from biomass. The fuel may include an alkali-containing material. Other alkali-containing materials known to those skilled in the art may be used in the processes to, for example, capture environmental pollutants.

Some power plants may include systems that operate using, for example, a process sometimes referred to as a "fluidized-bed combustion" process. One example of such a process is a circulating fluidized-bed combustion process, which may be used for electric power generation. Some examples of circulating fluidized-bed reactors may include gasifiers, combustors, and steam generators, and typically, circulating fluidized-bed reactors have an upright furnace or boiler.

During operation, fuel, for example, particulate fuel, is introduced into a lower part of a furnace, and primary and secondary gases, for example, air, may be supplied through a bottom and/or sidewalls of the furnace. Combustion of the fuel takes place in a bed of fuel particles and other solid particles, such as, for example, calcium carbonate, which may be included for sulfur dioxide capture, and/or inert material. For example, the fluidized-bed reactor (i.e., furnace) may be configured to suspend the bed of fuel particles and other materials on upward-blowing jets of the primary and/or secondary gases during the combustion process. The upward-blowing jets facilitate mixing of the fluid particles and other materials, which serves to improve combustion by, for example, reducing undesirable emissions and increasing combustion and heat transfer efficiency.

Exhaust gas and/or solid particles entrained in the bed may leave the furnace via an exhaust port in, for example, an upper part of the furnace and may be passed to a particle separator. In the particle separator, most or substantially all of the solid particles may be separated from the exhaust gas. Typically, one or more cyclones, which use tangential forces to separate particles from exhaust gas, are coupled with the furnace. During normal operation, cyclones may be capable of separating about 99.9% of the particles from the exhaust gas.

The exhaust gas and any remaining solid particles, or fly ash, may then be passed through additional processing units before ultimately being released into the atmosphere. For example, in an atmospheric circulating fluidized-bed system, the exhaust gas flows through a boiler and past its boiler tubes containing a supply of water, providing heat to convert the water to steam. The steam may then be used to drive a steam turbine, generating electricity. The exhaust gas may be passed through a heat exchanger to recover at least a portion of the heat generated during the combustion process, and the exhaust gas may be passed through environmental processing units to reduce levels of undesirable emissions, such as pollutants, for example, nitrogen oxides ("NOx"), sulfur oxides ("SOx"), and/or particulate matter ("PM").

Solid particles recovered in the particle separator, such as bottom ash, may be returned to the bed in the circulating fluidized-bed reactor for subsequent reaction and/or removal from the bed. Energy bound in the heated bottom ash may be at least partially recovered, for example, in an integrated fluidized-bed heat exchanger, before the ash is recycled to the circulating fluidized-bed reactor.

An exemplary integrated fluidized-bed heat exchanger is an INTREX™ steam superheater (Foster Wheeler Ltd.; Clinton, N.J., USA). In such a heat exchanger, bottom ash separated in a cyclone may pass over the INTREX™ steam superheater before returning to the circulating fluidized-bed reactor. The use of other fluidized-bed heat exchangers known to those skilled in the art is contemplated.

Combustion of the fuel particles and/or heating of other materials (e.g., calcium carbonate) may result in heating of alkali-containing materials, such that alkali compounds contained therein are released. The released alkali compounds may react with ash or other inorganic components, such as, for example, sulfur, chlorine, and/or silicon, which may result in undesirable deposits, ash accumulation, and/or corrosion occurring on exposed surface areas of the fluidized-bed components, for example, on furnace walls and/or boiler tubes. Such deposits and corrosion may lead to less efficient operation and/or lost production due to increased maintenance-related down time. Without being limited by theory, the alkali compounds may be released in a liquid or vapor form, which may be entrained in the fluidized bed or with the particles making up the fluidized bed. The alkali compounds may cause ash particles to stick together, leading to an undesirable ash accumulation (e.g., on boiler tubes) and fouling of the reactor system surfaces. Without being limited by theory, the alkali components and siliceous component of the ash may form a eutectic mixture that form crystalline/amorphous deposits on the reactor surfaces.

As a result, it may be desirable to remove at least a portion of the alkali compounds from the furnace before they react with the ash and/or other inorganic components, for example, to reduce or prevent undesirable deposits and/or corrosion.

Davidsson et al., in an article entitled, "Kaolin Addition during Biomass Combustion in a 35 MW Circulating Fluidized Bed-Boiler", *Energy & Fuels* 2007, 21, 1959-1966, describe adding kaolin to a circulating fluidized-bed boiler. Davidsson et al. specify using kaolin sold under a product name Intrafil C® and obtained from Imerys Minerals Ltd., and state that the addition of this highly-processed kaolin results in removal of alkali from the furnace. In particular, the kaolin used by Davidsson et al. is highly processed and may have a very low moisture and/or iron content.

Although the kaolin added by Davidsson et al. to the circulating fluidized-bed boiler may result in the removal of alkali from the furnace, the method described by Davidsson et al. may suffer from a number of possible drawbacks. For example, the kaolin added is a highly processed, fine powder kaolin, and an undesirably large portion of the kaolin was carded out of the circulating fluidized-bed reactor by the flue gases, and thus only a relatively small fraction of the kaolin remained in the furnace. This may result from, for example, the fineness of the kaolin, 36% of the kaolin having a particle size distribution of less than 1 μm, and 55% having a particle size distribution of less than 2 μm. Davidsson et al. indicate that an undesirably high amount of the kaolin ended up in the fly ash. Moreover, the kaolin used by Davidsson et al. may not be sufficiently cost effective due to the costs sometimes associated with such highly processed kaolin.

In light of these possible drawbacks, it may be desirable to identify a less costly method for removing alkali from a furnace, for example, the furnace of a fluidized-bed reactor.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to a method for combusting fuel in the presence of an alkali-containing material. The method may include introducing fuel, calcium carbonate, and hydrous clay into a furnace configured to combust the fuel, wherein the hydrous clay has a moisture content of at least about 5% by weight. The method further includes combusting at least a portion of the fuel, such that the hydrous clay is at least partially calcined and the at least partially calcined clay adsorbs at least a portion of alkali present in the furnace.

Another aspect of the disclosure relates to a method for operating a fluidized-bed reactor. The method includes introducing an alkali-containing material and hydrous clay into the fluidized-bed reactor. As used herein, "alkali-containing materials" and "alkali compounds" refer to materials containing carbonates and/or hydroxides of an alkali metal and/or alkaline earth metal, and/or salts and/or ions of an alkali metal and/or alkaline earth metal. The hydrous clay has a moisture content of at least about 5% by weight. The method further includes heating at least a portion of the alkali-containing material and hydrous clay, such that at least a portion of the hydrous clay is at least partially calcined and the calcined clay adsorbs at least a portion of alkali present in the fluidized-bed reactor. The method further includes removing at least a portion of the at least partially calcined clay and adsorbed alkali from the fluidized-bed reactor.

According to yet another aspect, a method for reducing alkali ash accumulation in a fluidized-bed reactor includes introducing an alkali-containing material into the fluidized-bed reactor and introducing hydrous clay into the fluidized-bed reactor, wherein the hydrous clay has a moisture content of at least about 5% by weight. The method further includes heating the alkali-containing material and the hydrous clay, such that at least a portion of the hydrous clay is at least partially calcined and the at least partially calcined clay adsorbs at least a portion of alkali present in the fluidized-bed reactor. The method further includes removing at least a portion of the calcined clay and adsorbed alkali from the fluidized-bed reactor.

In still a further aspect, a method for operating a fluidized-bed reactor includes introducing hydrous clay, fluidization media, and fuel into a furnace for combusting the fuel, such that a fluidized-bed is provided therein. At least a portion of the fluidized bed includes ash particles associated with alkali compounds. An amount of the hydrous clay ranging from about 30% to about 50% has a particle size of less than about 1 μm. The method further includes heating at least a portion of the fuel and hydrous clay, such that at least a portion of the hydrous clay is at least partially calcined. The method also includes reacting the alkali compounds with at least a portion of the at least partially calcined clay, wherein the at least partially calcined clay comprises solid material particles having a plurality of adsorption sites for adsorbing at least a portion of the alkali compounds.

Aside from the structural and procedural arrangements set forth above, the embodiments could include a number of other arrangements, such as those explained hereinafter. It is to be understood that both the foregoing description and the following description are exemplary only.

DESCRIPTION OF EMBODIMENTS

Reference will now be made in detail to a number of exemplary embodiments. Fuel may by combusted in a furnace to produce heat, and the heat produced may, in turn, be used to generate electric power, via, for example, a steam generator. Heating the fuel and/or materials (e.g., calcium carbonate) associated with a combustion process may result in release of alkali in the furnace. According to some embodiments, hydrous clay may be added to the furnace, and the heat may at least partially calcine the hydrous clay, such that the at least partially calcined clay is available to act as an adsorbent for at least a portion of the alkali within the furnace.

According to some embodiments, a method of operating a circulating fluidized-bed reactor system may include at least the steps of introducing an alkali-containing material into a circulating fluidized-bed furnace (e.g., a reactor), introducing a hydrous clay having a moisture content of at least about 5% (e.g., a moisture content ranging from about 5% by weight to about 15% by weight) into the circulating fluidized-bed reactor, and removing at least a portion of the clay (e.g., an at least partially calcined portion of the hydrous clay) from the circulating fluidized-bed reactor system.

According to some embodiments, hydrous clay may include lump clay, for example, hydrous clay that may be partially dried to a moisture content ranging from at least about 1% by weight to at least about 50% by weight. According to some embodiments, the lump clay may be partially dried to a moisture content ranging from about 4% by weight to about 16% by weight, for example, from about 8% by weight to about 12% by weight (e.g., about 10% by weight), from about 5% by weight to about 10% by weight, or from about 10% by weight to about 15% by weight.

In one embodiment, the lump clay may comprise hydrous clay agglomerates having a size of about 1 inch or less. In other embodiments, the lump clay may comprise hydrous clay agglomerates having a size of about ¾ inch or less, for example, about ½ inch or less. In other embodiments, the lump clay may comprise hydrous clay agglomerates having a size of about ¼ inch or less (e.g., to about ⅛ inch or less). In other embodiments, the lump clay may comprise hydrous clay agglomerates having a maximum lump size of not more than about 3 inches, such as not more than about 2 inches or not more than about 1 inch. In some embodiments, the lump clay may comprise hydrous clay agglomerates having a maximum lump size ranging from about 0.25 inch to about 2 inches, such as, for example, from about 0.25 inch to about 1 inch.

According to some exemplary embodiments, the hydrous clay may include one or more of lump clay, clay that has been shredded and/or crushed, non-beneficiated clay, kaolinite, ball clay (e.g., clay that includes about 20-80% kaolinite, 10%-25% mica, and/or 6%-65% quartz), and clay derived from overburden from a kaolinite mining operation (e.g., clay derived from material located over kaolinite deposits being mined). According to some embodiments, the hydrous clay may have a BET surface area of at least about 9 $m^2$/g, for example, at least about 10 $m^2$/g or at least about 15 $m^2$/g.

Alkali-containing materials according to some embodiments may serve as fuel for combustion. For example, alkali-containing materials may include one or more of coal, petroleum coke, and biofuel (e.g., fuel obtained from biomass). Exemplary coal sources include, without limitation, brown coal, lignite and bituminous coal, such as, for example, eastern bituminous coal, coking coal, Jurassic coal, Triassic coal, Permian coal, and carboniferous coal. In other embodiments, alkali-containing materials are substantially absent from the fuel used for combustion.

According to some embodiments, alkali-containing materials may include calcium carbonate. In some embodiments, the calcium carbonate may be provided as particulate limestone, marble, chalk, dolomite, aragonitic sand, sea shells, coral, and/or mixtures thereof. In one embodiment, the alkali-containing material may include a calcium carbonate originating from a marine originating deposit, for example, wherein the alkali may include residual salt from seawater.

According to some embodiments, fuel and/or alkali-containing material(s) and hydrous clay may be combined before being supplied to a furnace. For example, fuel and/or alkali-containing material and hydrous clay may be mixed and/or blended prior to combustion. In some embodiments, at least one of coal and petroleum coke may be mixed and/or blended with the hydrous clay. In other embodiments, calcium carbonate may be mixed and/or blended with the hydrous clay. In yet other embodiments, the hydrous clay may be added directly to a fluidized-bed reactor system. For example, the hydrous day may be added to the furnace or the hydrous day may be added to the bottom ash stream that is gravity fed to the furnace.

According to some embodiments, combustion may occur in a furnace, for example, a furnace that is part of a fluidized-bed reactor system for generating electric power via, for example, a steam generator. For example, the furnace may be part of a circulating fluidized-bed reactor system. The furnace may be part of other systems for combusting alkali-containing materials known to those skilled in the art.

In some embodiments, the hydrous clay may be at least partially converted to a calcined clay in the circulating fluidized-bed reactor. In some embodiments, the at least partially calcined clay may serve to adsorb at least a portion of alkali present in the fluidized-bed reactor.

Hydrous clay may be introduced, in some embodiments, at least twice to the circulating fluidized-bed reactor. In some embodiments, at least a portion of the alkali-containing material may be blended with at least a portion of the hydrous clay before the blended alkali-containing material and hydrous clay is introduced into the circulating fluidized-bed reactor. According to some embodiments, at least a portion of the hydrous clay may be introduced into a lower portion of the circulating fluidized-bed reactor. In some embodiments, at least a portion of the hydrous clay may be introduced into the back end of the circulating fluidized-bed reactor. In some embodiments, at least a portion of the hydrous clay may be introduced into an upper portion of the circulating fluidized-bed reactor. According to some embodiments, at least a portion of the hydrous clay may be introduced into an ash-slurry side of an integrated fluidized-bed heat exchanger.

Before alkali-containing material(s) and hydrous clay are introduced to the furnace, the size of at least one of the alkali-containing material and hydrous clay may, in some embodiments, be subjected to at least one physical modification process. For example, physical modification process(es) may serve to reduce the size of the at least one of the alkali-containing material and hydrous clay to, for example, about 1 inch or less. In some embodiments, an exemplary physical modification process may reduce the size of at least one of the alkali-containing material and hydrous day to about ¾ inch or less, for example, to about ½ inch or less. In some embodiments, the exemplary physical modification process may reduce the size of the at least one of the alkali-containing material and hydrous day to about ¼ inch or less (e.g., to about ⅛ inch or less). In other embodiments, the at least one of the alkali-containing material and hydrous clay may comprise hydrous clay agglomerates having a maximum lump size of not more than about 3 inches, such as not more than about 2 inches or not more than about 1 inch. Exemplary physical modification processes may include at least one of milling, hammering, roll crushing, drying, grinding, screening, extruding, triboelectric separating, liquid classifying, and air classifying.

According to some embodiments, the exemplary methods may include a step of removing a portion of the at least partially calcined clay from the furnace. For example, a portion of the at least partially calcined clay may be removed periodically. In some embodiments, for example, at least a portion of a fluidized bed may be removed (e.g., via pumping) once the bed reaches a predetermined height in a fluidized bed reactor. In some embodiments, at least partially calcined clay removal from the circulating fluidized bed reactor may be substantially continuous. In some embodiments, a portion of the at least partially calcined clay may be removed at a point external to the fluidized-bed reactor. For example, at least a portion of the at least partially calcined clay may be removed at an outlet of a particle separator of the fluidized-bed reactor system. In some embodiments, at least a portion of the at least partially calcined clay may be removed after passing through an integrated fluidized-bed heat exchanger. In some embodiments, at least a portion of the at least partially calcined clay may be removed from an overhead outlet of a cyclone, and such portion may be removed via at least one of a fabric filter and a baghouse.

According to some embodiments, inert material may be introduced into the furnace. Exemplary inert materials may include, for example and without limitation, sand, residues of fuel, and/or gypsum. In some embodiments, a fine inert material may be selected to improve separation efficiency in one or more cyclones that may be associated with the furnace. In some embodiments, a coarse inert material may be selected to increase the bulk of a fluidization bed.

The amount of hydrous clay introduced into the furnace may be selected based on, for example, an amount sufficient to maintain boiler efficiency. One measure of boiler efficiency relates to boiler steam temperature. In some embodiments, hydrous clay may be added in an amount sufficient to maintain a boiler steam temperature ranging from about 930° C. to about 1010° C., for example, in an amount sufficient to maintain a boiler steam temperature ranging from about 950° C. to about 1010° C. In some embodiments, hydrous clay may be added in an amount sufficient to maintain a boiler steam temperature ranging from about 970° C. to about 1010° C., for example, in an amount sufficient to maintain a boiler steam temperature ranging from about 1000° C. to about 1010° C. For example, for some fluidized bed reactors, an amount of hydrous clay (e.g., lump semi-dried kaolin) ranging from about 25 to about 85 tons per day may be added, for example, an amount ranging from about 40 to about 50 tons per day may be added. For example, for relatively low sulfur fuel, about 35 tons per day of hydrous clay may be added, and for relatively high sulfur fuel, about 50 tons per day of hydrous clay may be added. The fuel may include, for example, a combination of about 85% pet coke and about 15% coal, totaling about 100 tons per hour of fuel.

The hydrous clay used in the exemplary methods disclosed herein may have a measurable moisture content, In some embodiments, the hydrous clay may have a moisture content of at least about 1% (e.g., at least about 5%). For example, the moisture content of the hydrous clay may range from about 5% by weight to about 15% by weight, for example, from about 8% by weight to about 12% by weight. In some embodiments, the hydrous clay may have a moisture content ranging from about 9% by weight to about 11% by weight, for example, about 10% by weight (e.g., lump clay having a moisture content of about 10%).

The hydrous clay used in the exemplary methods disclosed herein may take various forms and/or may have undergone various processes. For example, the hydrous clay may include shredded and/or crushed clay. In some embodiments, hydrous clay may be non-beneficiated clay. As used herein, non-beneficiated clay may include clay that has not been subjected to at least one process chosen from dispersion, blunging, selective flocculation, ozone bleaching, classification, magnetic separation, chemical leaching, froth flotation, and dewatering of the clay. In some embodiments, at least a portion of the hydrous clay may be kaolinite, for example, a hydrous aluminosilicate having a formula, $Al_2Si_2O_5(OH)_4$. In some embodiments, the hydrous clay may include ball clay. In some embodiments, the hydrous clay may include clay derived from overburden from a kaolin mining operation. In some embodiments, the hydrous clay may be clay derived from crude clay having a moisture content of at least about 15%. For example, the hydrous clay may include montmorillonitic kaolin.

The hydrous clay used in the exemplary methods disclosed herein may be a combination of hydrous clays. For example, at least one hydrous clay may be selected to provide bonding strength to the combination of hydrous clays. In some embodiments, at least one hydrous clay may be selected to increase the coarseness of the hydrous clay combination.

According to some embodiments, the hydrous clay used in the exemplary methods disclosed herein may have a measurable BET surface area. For example, the BET surface area may be at least about 9 $m^2/g$, for example, the BET surface area may be at least about 10 $m^2/g$ or at least about 15 $m^2/g$, The hydrous clay used in the exemplary methods disclosed herein may have a measurable particle size. Particle sizes and other particle size properties referred to herein, such as particle size distribution ("psd"), may be measured using a SEDIGRAPH 5100 instrument as supplied by Micromeritics Corporation. For example, the size of a given particle may be expressed in terms of the diameter of a sphere of equivalent diameter that sediments through the suspension, that is, an equivalent spherical diameter or "esd."

The measurable particle size may indicate the relative coarseness of the hydrous clay. In some embodiments, about 30% to about 50% of the hydrous clay has a particle size less than about 1 μm. In some embodiments, about 35% to about 45% of the hydrous clay has a particle size less than about 1 μm. In some embodiments, about 30% to about 40% of the hydrous clay has a particle size less than about 1 μm. In some embodiments, about 40% to about 50% of the hydrous clay has a particle size less than about 1 μm.

In some embodiments, about 60% to about 80% of the hydrous clay has a particle size less than about 2 μm. In some embodiments, about 65% to about 75% of the hydrous clay has a particle size less than about 2 μm. In some embodiments, about 60% to about 70% of the hydrous clay has a particle size less than about 2 μm. In some embodiments, about 70% to about 80% of the hydrous clay has a particle size less than about 2 μm.

The hydrous clay used in the exemplary methods disclosed herein may have a measurable washed screen residue, for example, a measurable +325 washed screen retention. For example, the +325 mesh wash screen retention may be from about 0.5% to about 9%. In some embodiments, the +325 mesh wash screen retention may be from about 0.5% to about 8%. In some embodiments, the +325 mesh wash screen retention may be from about 0.5% to about 5%. In some embodiments, the +325 mesh wash screen retention may be from about 0.5% to about 1.5%. In some embodiments, the +325 mesh wash screen retention may be from about 4% to about 5%. In some embodiments, the +325 mesh wash screen retention may be from about 1% to about 4.5%. In some embodiments, the +325 mesh wash screen retention may be from about 4.5% to about 9%.

The exemplary methods disclosed herein may be used in association with a variety of fuel(s) and/or alkali-containing materials. In some embodiments, the fuel may contain an alkali material.

According to some embodiments, the fuel may include coal. Exemplary coal sources include, without limitation, lignite and bituminous coal, such as, for example, eastern bituminous coal, coking coal, Jurassic coal, Triassic coal, Permian coal, and carboniferous coal.

According to some embodiments, the fuel associated with the exemplary methods disclosed herein may include petroleum coke, for example, a carbonaceous solid derived from oil refinery coker and cracking units. In some embodiments, the fuel may include sand of petroleum coke. In some embodiments, the fuel may include combinations of coal and petroleum coke.

According to some exemplary methods disclosed herein, increasing the amount of hydrous clay added to the reactor system may permit a reduction in the amount of coal combusted in the circulating fluidized-bed reactor. For example, for about one part by weight of hydrous clay introduced to the system, the amount of coal introduced to the system may be reduced by about 5 parts by weight of coal.

According to some embodiments, the fuel associated with exemplary methods disclosed herein may include biofuel derived from, for example, biomass. Exemplary biomass sources may include, without limitation, wood pellets, straw pellets, peat, lignocellulose, waste biomass, such as bagasse, wheat stalks, corn stalks, oat stalks, and/or energy biomass, such as, for example, grasses of the *Miscanthus* genus.

In some embodiments, alkali-containing materials may include materials selected to reduce at least one of SOx and NOx. For example, the alkali-containing material(s) selected to reduce at least one of SOx and NOx may include calcium carbonate. For example, calcium carbonate may be derived from the sea. According to some embodiments, the material(s) may include at least one of a SOx- and NOx-getter.

According to one exemplary method, a method of operating a fluidized bed reactor system for reacting fuel may include introducing solid material particles, fluidization medium, and fuel into a reactor system having a reactor chamber to provided a fluidized bed therein. The fluidized bed may include ash particles associated with at least one alkali compound. The exemplary method may further include reacting the at least one alkali compound with at least a portion of the solid material particles. In some embodiments, the solid material particles may have a plurality of adsorption sites for adsorption of the at least one alkali compound. The solid material particles may include at least one hydrous clay. The at least one hydrous clay may be heated in the reactor system such that at least a portion of the at least one hydrous clay is at least partially calcined. The reacted solid material particles may be removed from the reactor chamber.

In some embodiments, about 30% to about 50% of the hydrous clay has a particle size less than about 1 μm. In some embodiments, about 35% to about 45% of the hydrous clay has a particle size less than about 1 μm. In some embodiments, about 30% to about 40% of the hydrous clay has a particle size less than about 1 μm. In some embodiments, about 40% to about 50% of the hydrous clay has a particle size less than about 1 μm.

In some embodiments, about 60% to about 80% of the hydrous clay has a particle size less than about 2 μm. In some embodiments, about 65% to about 75% of the hydrous clay has a particle size less than about 2 μm. In some embodiments, about 60% to about 70% of the hydrous clay has a particle size less than about 2 μm. In some embodiments, about 70% to about 80% of the hydrous clay has a particle size less than about 2 μm. Particle size measurement may be defined by, for example, standard Sedigraph "psd" analytical methods, as previously defined.

In addition to the hydrous clay, in some embodiments, the solid material particles may include at least one of a SOx- and NOx-getter and/or an inert material. An exemplary SOx-getter may include be, for example and without limitation, calcium carbonate. Exemplary inert materials may include, for example, sand, gypsum, and/or residues of fuel.

EXAMPLE

A circulating fluidized-bed reactor system was operated using a combination of petroleum coke and coal as fuel. A sample of hydrous clay, including a fine grained montmorillonitic kaolin clay (see Table of exemplary characteristic data below), was blended with coal. The coal had a moisture content ranging from about 12% to about 15% whereas the hydrous clay had a moisture content ranging from 8% to 12%. The hydrous clay and coal mixture was fed into the circulating fluidized-bed reactor along with petroleum coke. The ratio of hydrous clay/coal to petroleum coke was about 20% clay/coal and about 80% petroleum coke, with the hydrous clay addition rate ranging from 25 tons per day to 45 tons per day.

TABLE

| CHEMICAL ANALYSIS | |
|---|---|
| $SiO_2$ (%) | 46.5 |
| $Al_2O_3$ (%) | 37.5 |
| $Fe_2O_3$ (%) | 1.0 |
| $TiO_2$ (%) | 1.3 |
| $K_2O$ (%) | 0.3 |
| $Na_2O$ (%) | 0.1 |
| CaO (%) | 0.3 |
| MgO (%) | 0.3 |
| L.O.I. (%) | 13.2 |
| Carbon (%) | 0.10 |
| Sulfur (%) | 0.13 |
| PHYSICAL PROPERTIES | |
| pH | 4.5 |
| M.B.I. (meq/100) | 10.5 |
| Specific Surface Area ($m^2/g$) | 24.0 |
| PARTICLE SIZE | |
| +325 Mesh (% Retained) | 1.0 |
| % <20 (μm) | 99 |
| % <10 (μm) | 97 |
| % <5 (μm) | 94 |
| % <2 (μm) | 85 |
| % <1 (μm) | 76 |
| % <0.5 (μm) | 65 |

* Extruded 50/50 Clay/Flint

Adding the hydrous clay to the system improved at least boiler efficiency. The steam temperature exiting the boiler, which is one measure of boiler efficiency, did not decrease to about 900° C., which is the expected steam temperature after a few weeks in service and far lower than the optimal 1000° C. target. Instead, the steam temperature improved to about 950° C. after the initial addition of the hydrous clay. Following an increase of the amount of hydrous clay fed into the system, the steam temperature improved further to about 970° C.

Other embodiments of the disclosure will be apparent to those skilled in the art from consideration of the specification and practice of the exemplary embodiments disclosed herein. It is intended that the specification and examples be considered as exemplary only, with a true scope and spirit of the disclosure being indicated by the following claims.

What is claimed is:

1. A method for combusting fuel in the presence of an alkali-containing material, the method comprising:
   introducing fuel into a furnace configured to combust the fuel;
   introducing ball clay comprising 20-80% kaolinite, 10-25% mica, and 6-65% quartz and having a moisture content of at least about 5% by weight into the furnace; and
   heating at least a portion of the fuel and ball clay, such that at least a portion of the ball clay is at least partially calcined and the at least partially calcined ball clay adsorbs at least a portion of alkali present in the furnace.

2. The method of claim 1, wherein the ball clay has a moisture content ranging from about 5% by weight to about 15% by weight.

3. The method of claim 1, wherein the ball clay has a moisture content ranging from about 8% by weight to about 12% by weight.

4. The method of claim 1, wherein the ball clay comprises lump clay.

5. The method of claim 1, wherein the ball clay comprises clay that has been at least one of shredded and crushed.

6. The method of claim 1, wherein the ball clay comprises non-beneficiated ball clay.

7. The method of claim 1, wherein the ball clay has a BET surface area of at least about 9 m²/g.

8. The method of claim 1, wherein the ball clay has a BET surface area of at least about 15 m²/g.

9. The method of claim 1, wherein ball clay comprises clay derived from crude clay having a moisture content of at least about 15%.

10. The method of claim 1, further including introducing calcium carbonate into the furnace.

11. The method of claim 1, further comprising incorporating the furnace into a fluidized-bed reactor system.

12. The method of claim 11, wherein the fluidized-bed reactor system is a circulating fluidized-bed reactor system.

13. The method of claim 1, wherein the step of heating results in calcining at least a portion of the ball clay, and the method further comprises:
   adsorbing at least a portion of alkali in the furnace via the calcined clay; and
   removing at least a portion of the calcined clay and adsorbed alkali from the furnace.

14. The method of claim 1, wherein the fuel is coal, petroleum coke, or biofuel, or a combination of any of the foregoing.

15. The method of claim 1, wherein the ball clay comprises ball clay agglomerates having a size of no more than about 3 inches.

16. The method of claim 15, wherein the ball clay agglomerates have a size of no more than about 2 inches.

17. The method of claim 16, wherein the ball clay agglomerates have a size of no more than about 1 inch.

18. A method for combusting fuel in the presence of an alkali-containing material, the method comprising:
   introducing fuel and calcium carbonate into a furnace configured to combust the fuel;
   introducing ball clay into the furnace, the ball clay comprising 20-80% kaolinite, 10-25% mica, and 6-65% quartz and having a moisture content of at least about 5% by weight; and
   heating at least a portion of the fuel, calcium carbonate, and ball clay, such that at least a portion of the ball clay is at least partially calcined and the at least partially calcined clay adsorbs at least a portion of alkali present in the furnace.

19. A method for operating a fluidized-bed reactor, the method comprising:
   introducing an alkali-containing material into a fluidized-bed reactor;
   introducing ball clay into the fluidized-bed reactor, the ball clay comprising 20-80% kaolinite, 10-25% mica, and 6-65% quartz and having a moisture content of at least about 5% by weight;
   heating at least a portion of the alkali-containing material and ball clay, such that at least a portion of the ball clay is at least partially calcined and the at least partially calcined clay adsorbs at least a portion of alkali present in the fluidized-bed reactor; and
   removing at least a portion of the at least partially calcined clay and adsorbed alkali from the fluidized-bed reactor.

20. The method of claim 1, wherein the ball clay is added in an amount sufficient to maintain a boiler temperature in the range of about 930° C. to about 1010° C.

* * * * *

UNITED STATES PATENT AND TRADEMARK OFFICE
CERTIFICATE OF CORRECTION

PATENT NO. : 10,641,482 B2
APPLICATION NO. : 14/833294
DATED : May 5, 2020
INVENTOR(S) : Billie Leach et al.

Page 1 of 1

It is certified that error appears in the above-identified patent and that said Letters Patent is hereby corrected as shown below:

On the Title Page

Item (60), under "Related U.S. Application Data," Lines 2-3, "application No. PCT/US2009/005805 on Oct. 26, 2008" should read --application No. PCT/US2009/005805 on Oct. 26, 2009--.

Signed and Sealed this
Eighth Day of September, 2020

Andrei Iancu
*Director of the United States Patent and Trademark Office*